US006231446B1

(12) United States Patent
Majima et al.

(10) Patent No.: US 6,231,446 B1
(45) Date of Patent: May 15, 2001

(54) PANEL MOUNTING APPARATUS FOR GAME MACHINE AND GAME MACHINE USING THE SAME

(75) Inventors: Shiro Majima, Artarmon (AU); Hachitaro Sato, Zama (JP)

(73) Assignee: Konami Co., Ltd., Hyogo-ken (JP)

( * ) Notice: Subject to any disclaimer, the term of this patent is extended or adjusted under 35 U.S.C. 154(b) by 0 days.

(21) Appl. No.: 09/109,351

(22) Filed: Jul. 2, 1998

(30) Foreign Application Priority Data

Aug. 8, 1997 (JP) .................................................. 9-215091

(51) Int. Cl.[7] ...................................................... A63F 13/00
(52) U.S. Cl. ................................................................ 463/46
(58) Field of Search .................................. 463/46, 7, 20; 273/138.1; 248/202.1, 220.21, 917; 312/24, 25, 26

(56) References Cited

U.S. PATENT DOCUMENTS 575,602 * 1/1897 Gramelspacher ................. 248/176.1
2,518,985 * 8/1950 Geyh ................................ 248/176.1
2,790,887 * 4/1957 Geffand ............................ 248/176.1
3,075,699 * 1/1963 Carman et al. ................... 248/202.1
4,084,194 * 4/1978 Hector .................................. 358/254
4,440,457 * 4/1984 Fogelman et al. .................... 312/7.2
4,473,261 * 9/1984 Jungmann ............................ 312/319
4,813,675 * 3/1989 Greenwood ............................ 463/46
5,177,616 * 1/1993 Riday .................................. 358/254
5,179,447 * 1/1993 Lain .................................... 358/254
5,276,524 * 1/1994 Inoue et al. .......................... 358/237
5,769,369 * 6/1998 Meinel ............................. 248/176.1
5,813,914 * 9/1998 McKay et al. ......................... 463/46
6,005,641 * 12/1999 Ui ........................................ 348/836
6,161,805 * 12/2000 Wells .................................. 248/118

FOREIGN PATENT DOCUMENTS 196 13 422 9/1997 (DE) .
0738991 10/1996 (EP) .
2214219 8/1989 (GB) .
2251329 7/1992 (GB) .
6261972 9/1994 (JP) .
7031717 2/1995 (JP) .

* cited by examiner

*Primary Examiner*—Stephen F. Gerrity
*Assistant Examiner*—John Paradiso
(74) *Attorney, Agent, or Firm*—Jordan and Hamburg LLP

(57) ABSTRACT

In a panel mounting apparatus for mounting a light-transmittable panel to an opening of a top box of a game machine containing a fluorescent lamp, a pair of retainer frames for retaining a pair of parallel ends of the panel are formed on the periphery of the opening. One of the retainer frames is provided with a movable member for changing the shape of the retainer frames between a state of preventing the removal of the panel and a state of allowing the attachment and detachment of the panel. Disclosed also is a game machine using the panel mounting apparatus.

14 Claims, 11 Drawing Sheets

PANEL MOUNTING APPARATUS FOR GAME MACHINE AND GAME MACHINE USING THE SAME

BACKGROUND OF THE INVENTION

The present invention relates to an apparatus for mounting a light-transmittable panel to an accommodating section of a lighting fixture in a game machine, such as a slot machine, and to a game machine using the same.

In a game machine, a panel, on which various information such as the title of the game machine and illustration of prizes are painted, is usually provided on a front surface of a housing and it is illuminated from an inside of the housing to decorate the game machine. Such a panel mounting apparatus has been popular in which the whole circumference of a panel formed by a light-transmittable material, such as acryl, is surrounded by a single retainer frame, and the retainer frame is secured to the housing of the game machine by a fixing member, such as a bolt (disclosed in, for example, Japanese Unexamined Patent Publication Nos. 6-261972 and 7-31717).

According to the above conventional mounting apparatus, it is necessary to remove the large retainer frame from the housing when checking and exchanging the panel and lighting fixture, and to reassemble the retainer frame after the checking operation and so forth, resulting in the efficiency of the operation being reduced.

Regarding a top box provided on the upper portion of the housing, there is an example whereby the panel and its retainer frame are mounted to a door of the front of the box, and the lighting fixture is accommodated in the main body of the box, thereby allowing the lighting fixture to be detachable without the attachment and detachment of the panel (disclosed in, for example, Australian Patent No. 644996). Even in this case, however, there has not been improvement in the amount of labor required to attach and detach the panel.

SUMMARY OF THE INVENTION

Accordingly, it is an object of the present invention to provide a panel mounting apparatus which allows easy detachment and attachment of a panel and a lighting fixture placed inside thereof, and a game machine using the same.

According to an aspect of the present invention, there is provided a panel mounting apparatus for a game machine for mounting a light-transmittable panel to an opening of a lighting fixture accommodating section provided in a housing of a game machine. The panel mounting apparatus includes: a pair of retainer frames for retaining a pair of parallel ends of the panel which are formed on the periphery of the opening of the accommodating section, and a movable member which is provided on one of the retainer frames for changing the shape of the retainer frames between a state of preventing the removal of the panel and a state of allowing the attachment and detachment of the panel.

By the above arrangement, the movable member provided on one of the retainer frames is operated to change the shape of the retainer frames, whereby the panel can be attached and detached, so that there is no need for removing the overall large retainer frame surrounding the whole circumference of the panel. In addition, by removing the panel, not only the panel can be exchanged, but also the accommodating section can be opened to effect the exchange, and the maintenance and checking of the lighting fixture.

In the panel mounting apparatus, the movable member may be movably provided between the position where the movable member opposes the front surface of the panel to prevent the removal of the panel and the position where the movable member is pulled out substantially toward a front of the game machine to allow the panel to be attached and detached.

By the above arrangement, a space between the movable member and the panel is expanded when the movable member is pulled out to the front of the game machine, so that the panel can be removed to the front of the housing by disengaging the panel and the retainer frame.

In the panel mounting apparatus, the accommodating section may be provided in a top box placed on the upper end of the housing, the pair of retainer frames may be provided on the upper and lower edges of an opening formed at the front of the top box, and the movable member may be provided on the retainer frame of the lower end of the top box.

By the above arrangements, the restraint of the lower end of the panel by the retainer frame is removed by pulling out the movable member toward the front of the top box, whereby the panel can be pulled out diagonally downward. Therefore, the panel of the top box, especially when placed at high position, can be easily removed.

The panel mounting apparatus may further comprise: a restraining member movable between the position where the movable member is restrained at the removal-preventing position of the panel and the restraint-removal position where the restraint is removed; a driving member for driving the restraining member towards the restraint-removal position by an operation from outside of the housing; and locking means for switching between an unlocked state of allowing the restraining member to be driven by the driving member towards the restraint-removal position and a locked state of preventing the restraining member from being driven by the driving member towards the restraint-removal position on the basis of an operation of a predetermined key.

By the above arrangement, in the unlocked state, the restraint of the movable member can be removed by operating the driving member from the outside of the housing and thereafter, the panel can be attached and detached by operating the movable member. In the locked state, the movable member cannot be operated through the driving member, and the movable member is restrained, whereby the panel cannot be attached and detached. The panel cannot be removed by operating the movable member without a key suitable for the lock means, so that the security of the game machine against an offense is increased.

In the panel mounting apparatus, the movable member may be provided so as to oppose one end surface of said panel, and the movement of the movable member in the direction to cross a plane of one end surface may allow the panel to be attached and detached.

By the above arrangements, by pressing the panel towards the movable member provided on one of the retainer frames, the other retainer frame can be disengaged from the panel and the panel can be pulled out to the front of the housing.

In the panel mounting apparatus, the movable member may be formed as an elongated member extending along one end surface of the panel, the movement of the movable member along the length thereof may allow an engaging portion provided on one end of the movable member along the length thereof to be engaged with a corresponding engaging portion of the housing, and the other end of the movable member is mounted to the housing through a mounting member with the engagement of the engaging portions maintained.

By the above arrangements, by only moving the movable member in the direction along the length thereof to bring the engaging portions into engagement with each other and thereafter, the other end of the movable member is mounted to the mounting member, the mounting of the movable member is completed. Therefore, the movable member can be mounted easily as compared with a case where both ends of the movable member are secured by mounting members such as screws.

In the panel mounting apparatus, the mounting member may be a screw, and play for allowing the movable member to be moved in the direction to cross a plane of one end surface may be produced between the engaging portions when the screw is loosened.

By the above arrangements, only loosening of the screw on the other end of the movable member allows the panel to be attached and detached. Therefore, the panel can be efficiently attached and detached.

In the panel mounting apparatus, the housing includes a main body, a door for opening and closing the front of the main body, and locking means for restricting the opening and closing of the door, the accommodating section is provided in the door, the movable member is mounted in the door by a mounting member mounted from the inside of the door, and the movable state of the movable member in the direction to cross a plane of one end surface of the panel and the unmovable state are switched in response to the operation of the mounting member.

By the above arrangement, the panel cannot be attached and detached unless the lock member is unlocked to open the door, and unless the mounting member is operated from the inside of the door to switch the movable member to a movable state. Therefore, the security of the game machine against an offense is increased.

According to another aspect of the present invention, there is provided a game machine including: a housing having provided therein a lighting fixture accommodating section; a light-transmittable panel to be mounted to an opening of the accommodating section; and a panel mounting apparatus for mounting the light-transmittable panel, wherein the panel mounting apparatus includes: a pair of retainer frames for retaining a pair of parallel ends of the panel which are formed on the periphery of the opening of the accommodating section, and a movable member which is provided on one of the retainer frames for changing the shape of the retainer frames between a state of preventing the removal of the panel and a state of allowing the attachment and detachment of the panel.

Other features and objects of the present invention will be made clear together with variation thereof from the following description regarding the preferred embodiment with reference to the accompanying drawings.

BRIEF DESCRIPTION OF THE DRAWINGS

FIGS. 10A to 10C illustrate a movable member in detail which is provided to the mounting apparatus of FIG. 9, in which FIG. 10A is a plan view;

FIG. 10B is a front view; and

FIG. 10C is a side view in the direction of the arrow Xc of FIG. 10B;

FIGS. 11A and 11B illustrate a construction on the side of the inner surface of the door of FIG. 8, in which FIG. 11A is a perspective view showing the overall construction; and FIG. 11B is a vertical sectional view of the movable member in the part XIB of FIG. 11A along the length thereof; and FIGS. 12A and 12B illustrate a construction of a slot machine to which a locking device according to an embodiment of the present invention is incorporated, in which FIG. 12A is a perspective view showing a state where the door of the housing is closed; and FIG. 12B is a perspective view showing the internal structure by opening the door of the housing.

DESCRIPTION OF THE PREFERRED EMBODIMENT

Figure 12B:
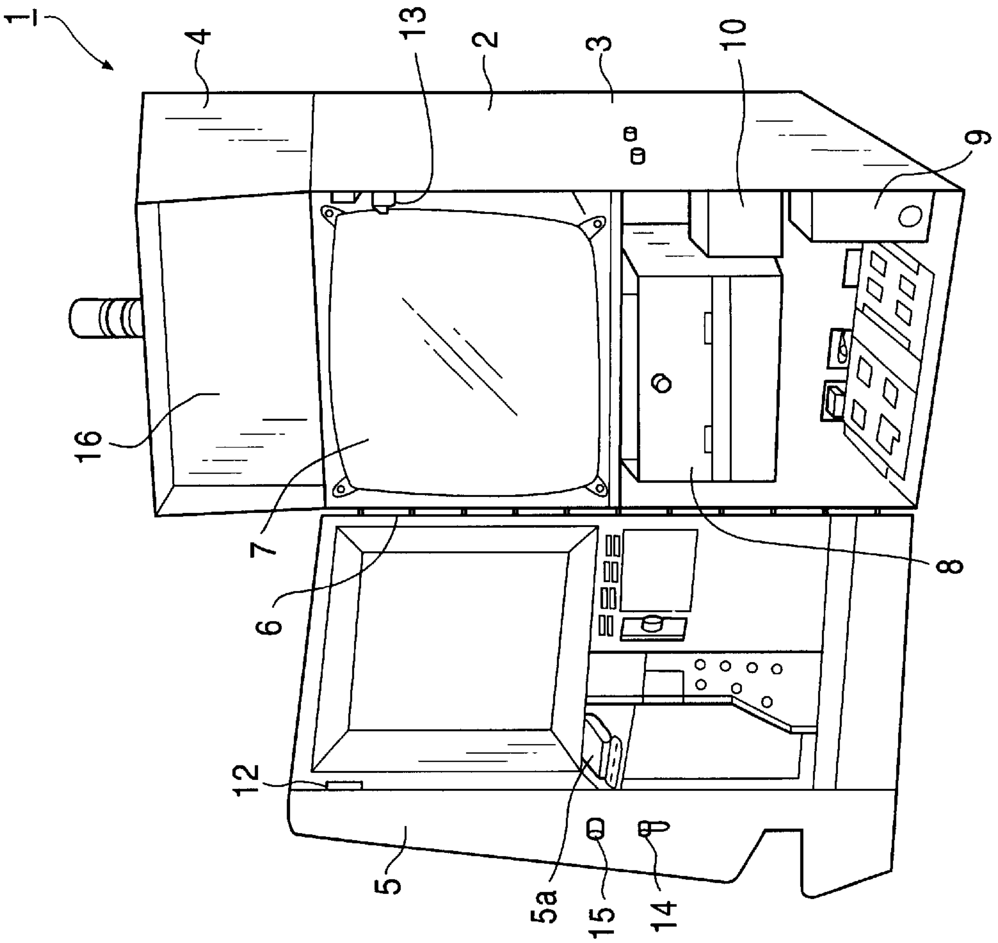
Figure 12A:
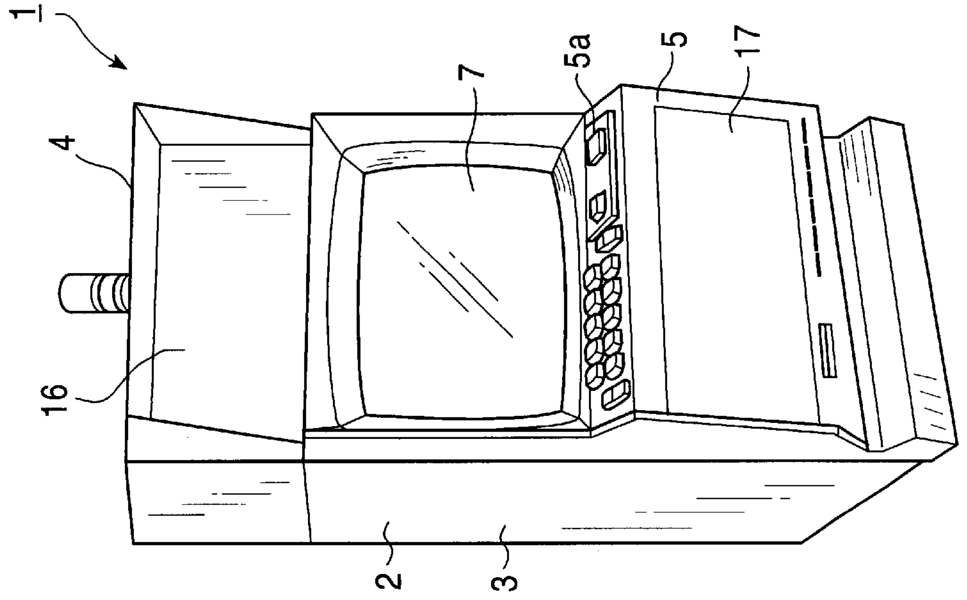

FIG. 12 illustrates an embodiment of a slot machine to which a mounting apparatus of the present invention is incorporated. A slot machine 1 is composed of a longitudinal housing 2 having various types of components fitted to the inside and outside thereof. The housing 2 has a main body 3 and a top box 4 mounted on the main body 3. A door 5 is mounted to the front of the main body 3 so as to be opened and closed using a hinge 6 fitted to the left of the door 5. A monitor 7 is accommodated in the main body 3, and an electric parts box 8, an AC power-supply unit 9 and a mount base 10 for mounting a device (not shown) for checking a piece of paper inserted in a slip insert 5*a* are provided below the monitor 7. A fixing member 12 disposed at the right of the door 5 is engaged with an engagement pawl 13, so that the door 5 is closed. When a knob 14 projected from the right of the door 5 is operated, the engagement pawl 13 is disengaged from the fixing member 12, so that the door 5 can be opened. A lock 15 is disposed above the knob 14. The lock 15 can switch between a locked and unlocked state of the door 5.

Display panels 16 and 17 are provided on the front of the top box 4 and the door 5, respectively. The display panels 16 and 17 include rectangular panels formed of light-transmittable materials, such as acryl, on which the title of the game machine, illustration of prizes and decorative patterns are painted. The present invention is applicable to the mounting of the display panels 16 and 17.

Figure 1:
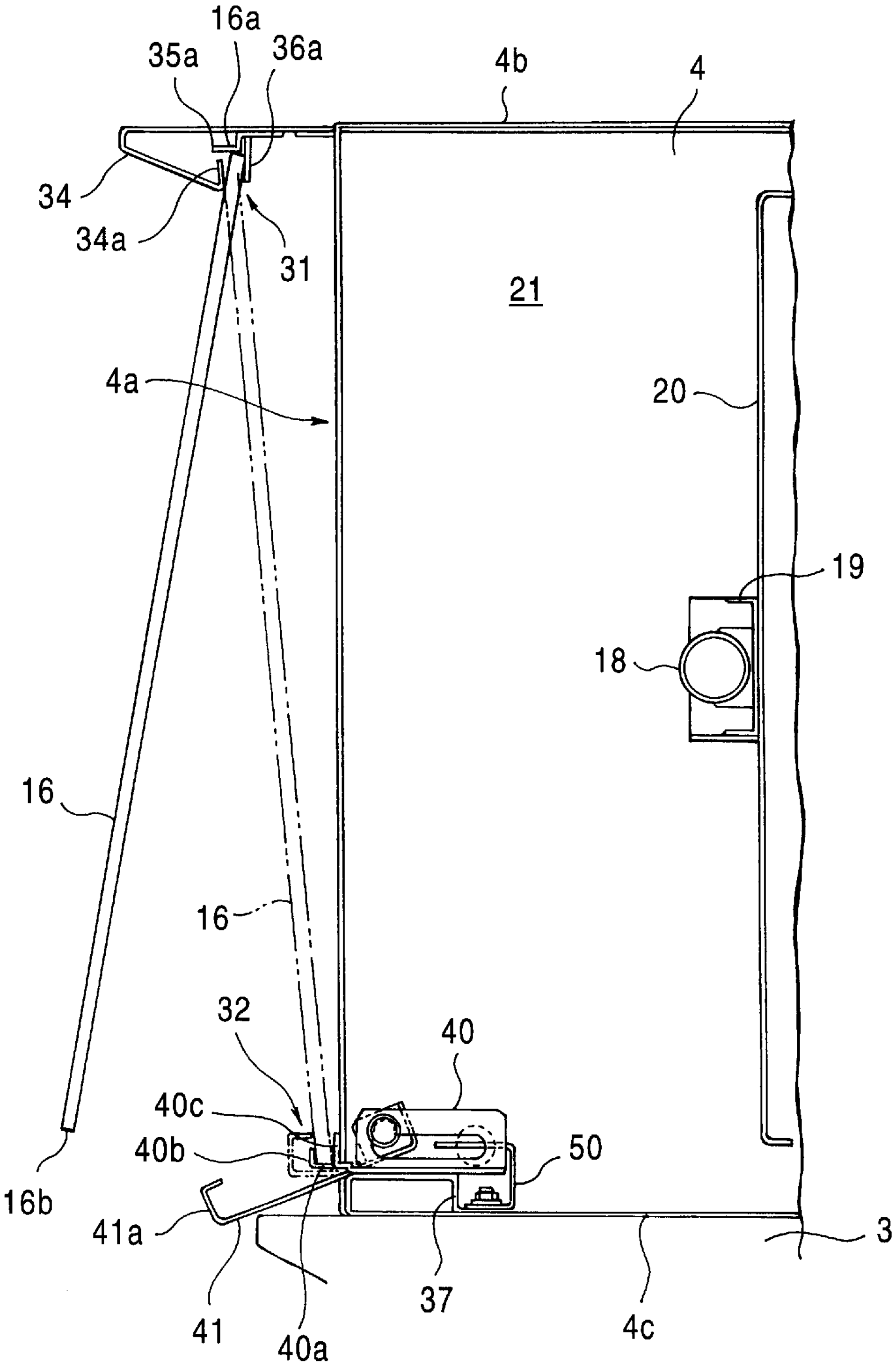
FIG. 1 is a vertical sectional view of a top box in a longitudinal direction in a slot machine to which a panel mounting apparatus of the present invention is incorporated.

FIGS. 1 to 7 illustrate details of an apparatus for mounting the display panel 16 to the top box 4. As shown in FIG. 1, a fluorescent lamp accommodating section 21 including a fluorescent lamp 18, a fluorescent lamp holder 19 and a reflecting plate 20 are provided inside the top box 4. An opening 4*a* is provided at the front of the top box 4, and a pair of retainer frames 31 and 32 to be engaged with the upper and lower ends 16*a* and 16*b*, respectively, of the display panel 16 are formed at the upper and lower edges of the opening 4*a*. The left and right ends of the opening 4*a* are defined by a pair of side frames 22 mounted to the front end of the top box 4 (see FIG. 4).

Figure 2:
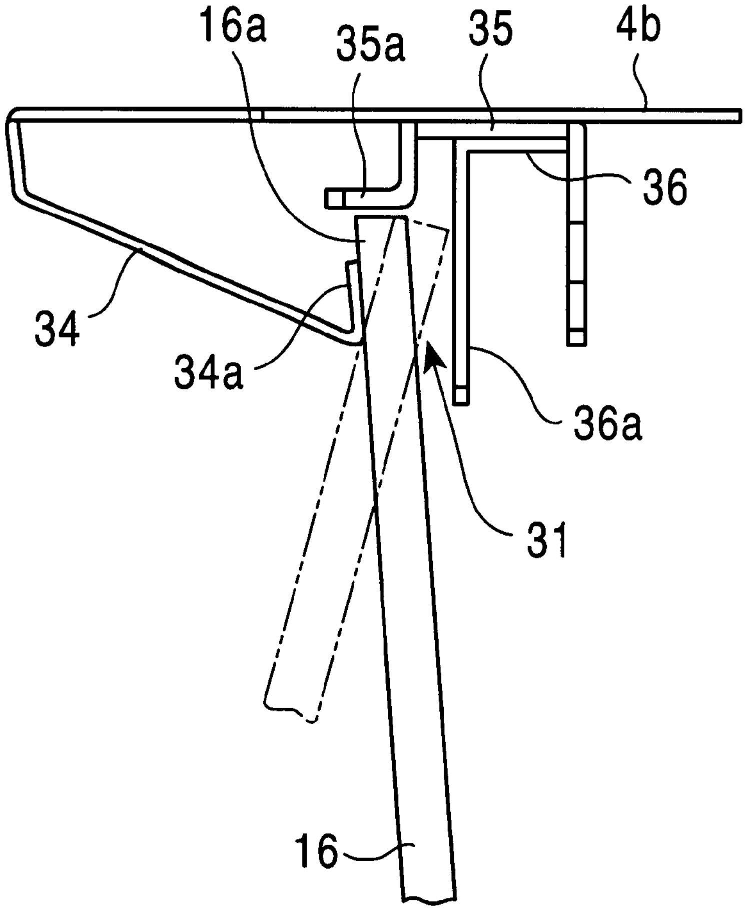
FIG. 2 is an enlarged view of a retainer frame provided on the upper part of the top box of FIG. 1.

As shown in FIG. 2, the upper retainer frame 31 is composed of a front wall portion 34*a*, an upper wall portion 35*a* and a rear wall portion 36*a* provided to retainer frame components 34, 35 and 36, respectively, which are fixed to the front end of a top plate 4*b* of the top box 4, so as to surround the upper end portion 16*a* of the display panel 16 from front and back (left and right in FIG. 2) and from above. The space between the front wall portion 34*a* and the rear wall portion 36*a* is set somewhat wider than the thickness of the display panel 16 so that the display panel 16 can be rocked back and forth using the retainer frame 31 as a fulcrum.

Figure 3:
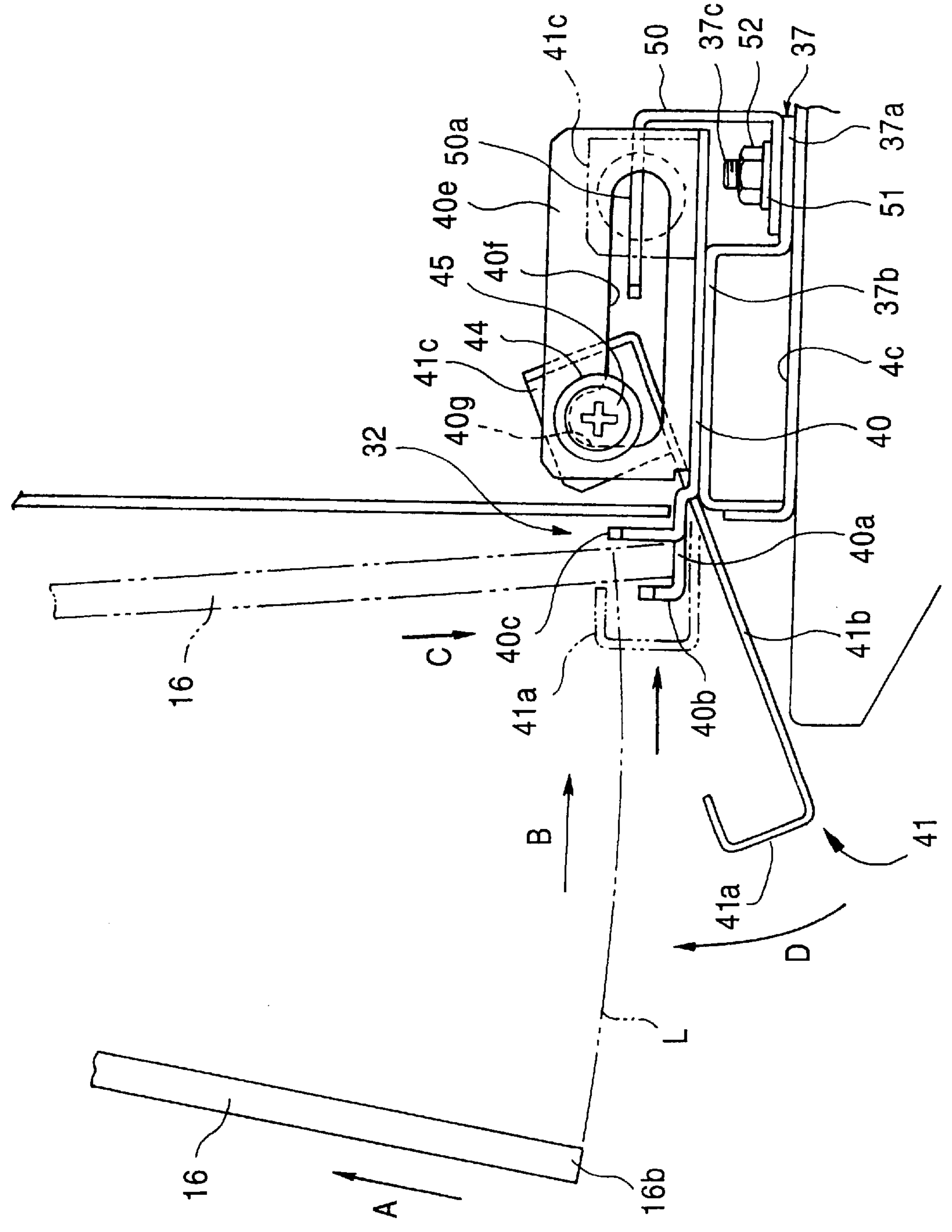
FIG. 3 is an enlarged view of a retainer frame provided on the lower part of the top box of FIG. 1.
Figure 4:
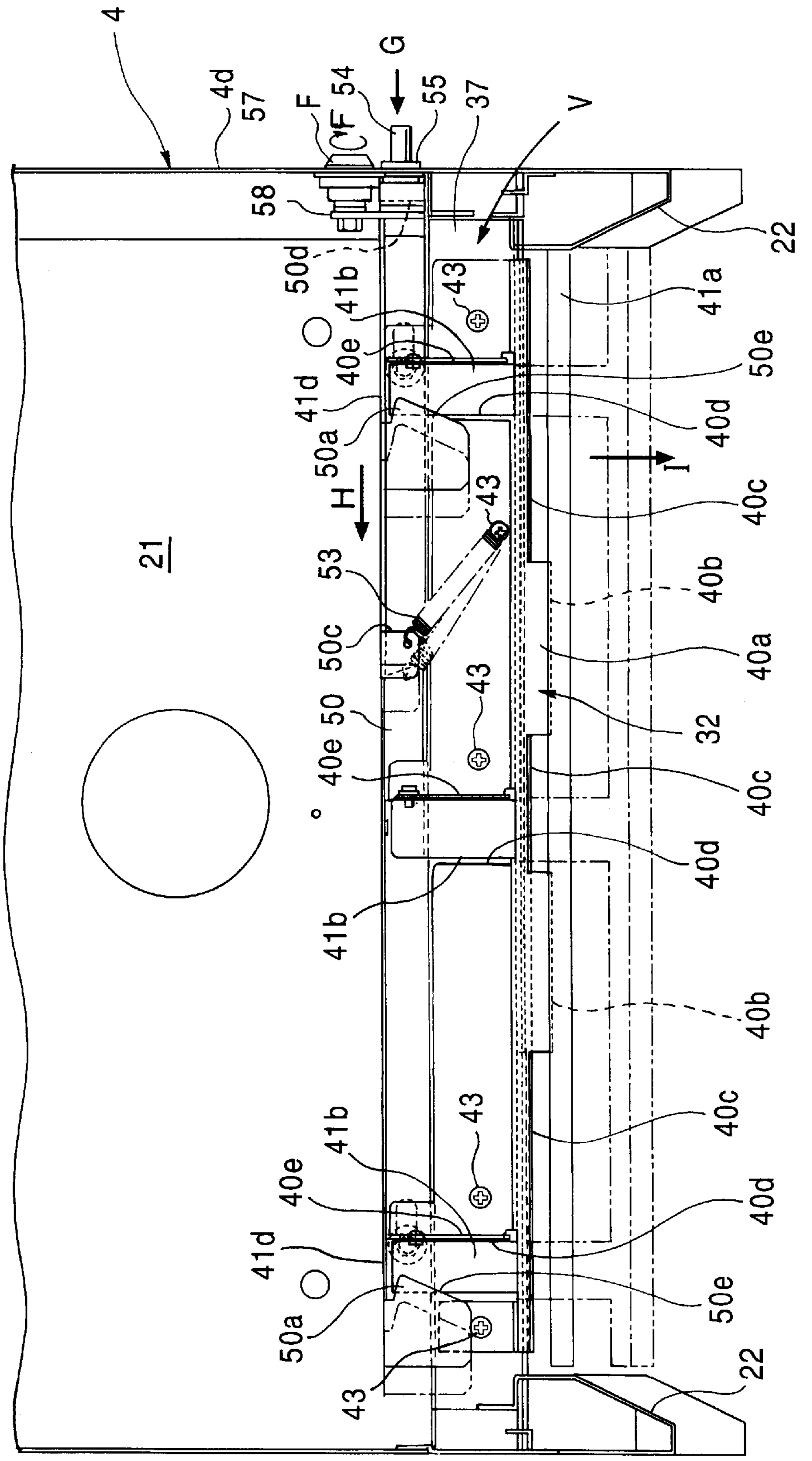
FIG. 4 is a plan view showing the retainer frame provided on the lower part of the top box of FIG. 1 and its peripheral components.
Figure 5:
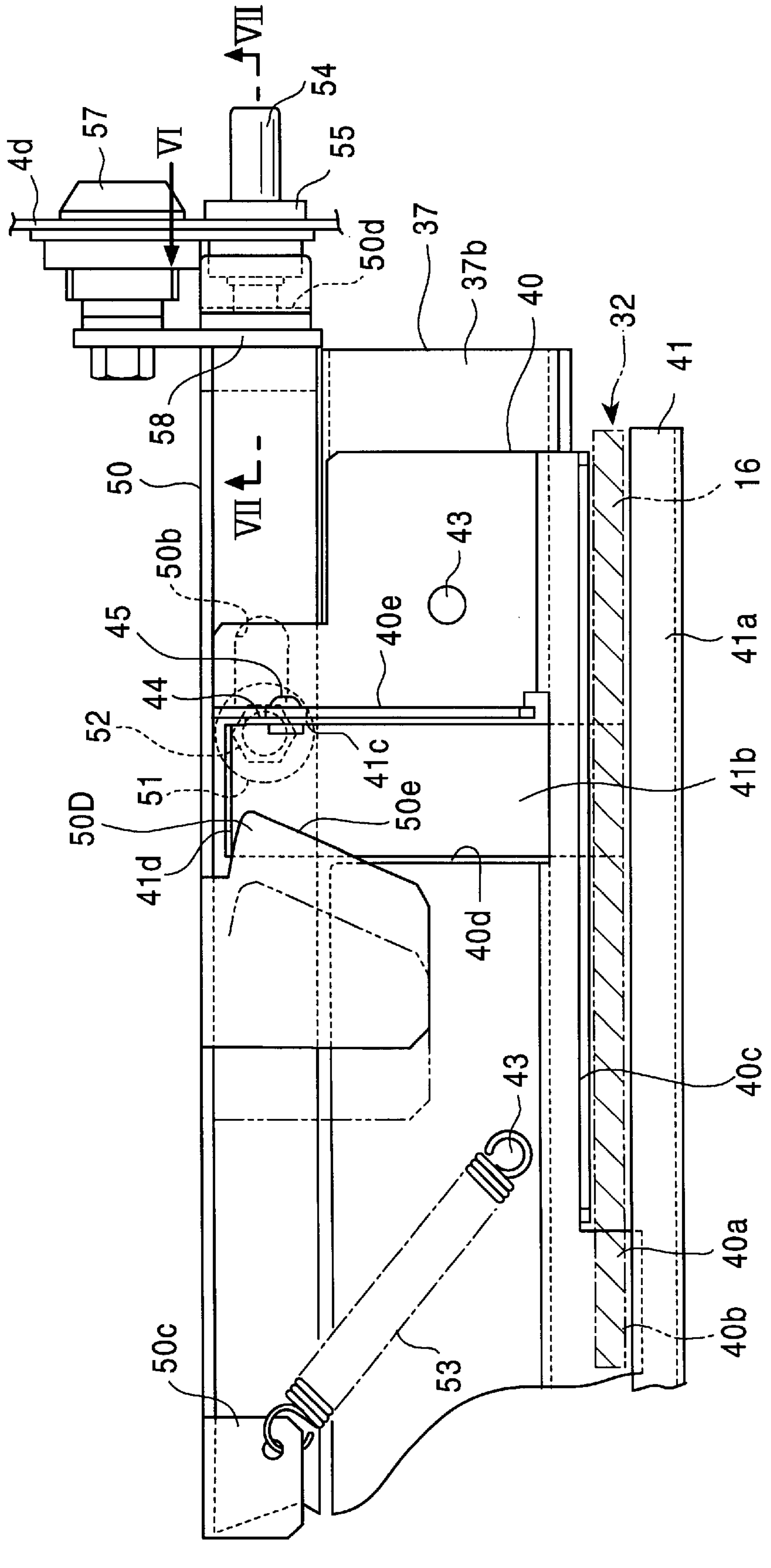
FIG. 5 is a detailed view of the part V of FIG. 4.

As shown in FIGS. 3 to 5 in detail, a mount base 37 extending along substantially the entire length of the lower edge of the opening 4*a* is mounted to the bottom plate 4*c* of the top box 4 by the use of joining means, such as welding. The mount base 37 includes a junction 37*a* to be joined to the bottom plate 4*c* and a supporting portion 37*b* raised higher than the junction 37*a*. A holding member 40 and a movable member 41 for forming the retainer frame 32 are disposed on the upper surface of the supporting portion 37*b*, and a restraining member 50 is provided on the upper surface of the junction 37*a*. The mount base 37, holding member 40, movable member 41 and restraining member 50 are made of thin plate, such as steel plate, formed into a predetermined shape by a plate work.

The holding member 40 is secured to the mount base 37 by a plurality of screws 43 (see FIG. 4). A panel receiver 40*a* raised higher than the supporting portion 37*b* of the mount base 37, a front wall portion 40*b* bent almost perpendicularly upward from the panel receiver 40*a*, and a rear wall portion 40*c* are provided at the front end of the holding member 40. The space between the front and rear wall portions 40*b* and 40*c* is set somewhat wider than the thickness of the display panel 16 so as to receive the lower end 16*b* of the display panel 16.

The front wall portion 40*b* is formed lower than the rear wall portion 40*c*. More particularly, the height of the front and rear wall portions 40*b* and 40*c* is set such that the front wall portion 40*b* is below the locus L of the lower end of the display panel 16, and the rear wall portion 40*c* projects above the locus L when the display panel 16 is rocked using the upper retainer frame 31 (see FIG. 2) as a fulcrum while abutting the display panel 16 against the retainer frame 31.

The movable member 41 is provided with a front frame 41*a* extending along substantially the entire lateral length of the opening 4*a*, and three supporting plates 41*b* extending from the lower end of the front frame 41*a* to the inside of the opening 4*a*. Before the holding member 40 is secured to the mount base 37, the movable member 41 is attached to the lower surface of the panel receiver portion 40*a* of the holding member 40 while fitting the supporting plates 41 b to cutouts 40*d* of the holding member 40. Thereafter, the holding member 40 is secured to the mounting base 37 by screws 43.

The holding member 40 is provided with a plurality (three in the drawing) of guide wall portions 40*e* which are parallel to the longitudinal direction of the game machine, and each of the supporting plates 4 lb of the movable member 41 is provided with an attachment plate 41*c* extending along the guide wall portions 40*e*. As is apparent from FIG. 3, an elongated hole 40*f*, or slot, extending longitudinally is formed in the guide wall portion 40*e*. A screw 45 attached to the elongated hole 40*f* through a washer 44 is screwed into the attachment plate 41*c*, whereby the movable member 41 is supported by the holding member 40 in the state where it can move forward and backward along the elongated hole 40*f*.

When the movable member 41 is pulled out to a maximum to the front of the game machine, the screw 45 is guided by an upward flexure 40*g* provided at the front end of the elongated hole 40*f*, so that the movable member 41 projects to the front of the game machine in a forward lowering state, as shown by solid lines in FIG. 3. In this state, the front frame 4 la moves to the outside of the locus L of the display panel 16. Therefore, the upper end portion 16*a* of the display panel 16 is fitted to the retainer frame 31 to raise the whole display panel 16 (the arrow A), and then the display panel 16 is rocked toward the back of the game machine using the retainer frame 31 as a fulcrum (the arrow B), and the display panel 16 is lowered onto the upper surface of the panel receiver 40*a* (the arrow C), whereby the lower end portion 16*b* of the display panel 16 can be inserted into a space surrounded by the front and rear wall portions 40*b* and 40*c* and the panel receiver 40*a*.

When the front frame 4 la of the movable member 41 is pressed in to a maximum while being raised after the insertion of the display panel 16 (see the arrows D and E), the front frame 41 a covers the front wall portion 40*b* of the holding member 40 and projects to the inside of the locus L of the display panel 16, as shown by imaginary line in FIG. 3. This makes it impossible to remove the display panel 16. The lower retainer frame 32 of the top box 4 is constituted by the front frame 4 la of the movable member 41, the front wall portion 40*b* of the holding member 40, the panel receiver 40*a* and the rear wall portion 40*c*.

To remove the display panel 16, the movable member 41 is pulled out to the front, and the display panel 16 is raised to rock the lower end portion 16*b* thereof to the front of the game machine, and thereafter the display panel 16 is lowered and the upper end 16*a* is removed from the retainer frame 31. This allows the display panel 16 to be exchanged, and allows maintenance and exchange of the fluorescent lamp 18 to be effected. As is apparent from FIG. 4, the front wall portion 40*b* and the rear wall portion 40*c* are shifted in the lateral direction of the top box 4, and the panel receiver 40*a* does not exist in front of the rear wall portion 40*c*. Therefore, at the forward portion of the rear wall portion 40*c*, the lower end 16*b* can be directly held by hand to raise the display panel 16.

Engagement plates 41*d* parallel to the lateral direction of the game machine are disposed at the rear ends of the left and right supporting plates 41*b* of the movable member 41. The engagement plates 41*d* are engaged with engagement pawls 50*a* of the restraining member 50, so that the movable member 41 is restrained at the rearmost end of its moving range, i.e., the position where the removal of the display panel 16 is prevented.

A plurality of elongated holes, or slots 50*b*, (only one is shown in FIG. 5) extending along the lateral direction of the game machine are formed in the constraining member 50. A nut 52 is screwed into a screw member 37*c* secured to the junction 37*a* through a washer 51 from above the restraining member 50 with the screw member 37*c* slidably fitted to the slot 50*b*. This allows the restraining member 50 to be mounted to the mount base 37 in a movable state in the lateral direction of the game machine. A tension spring 53 is provided between one of the screws 43 for securing the holding member 40 and a spring retainer 50*c* of the restraining member 50. The restraining member 50 is urged by the tensile force of the spring 53 toward the right of FIG. 4, i.e., in the direction in which the engagement pawl 50*a* is engaged with the engagement plate 41*d*.

Figure 6:
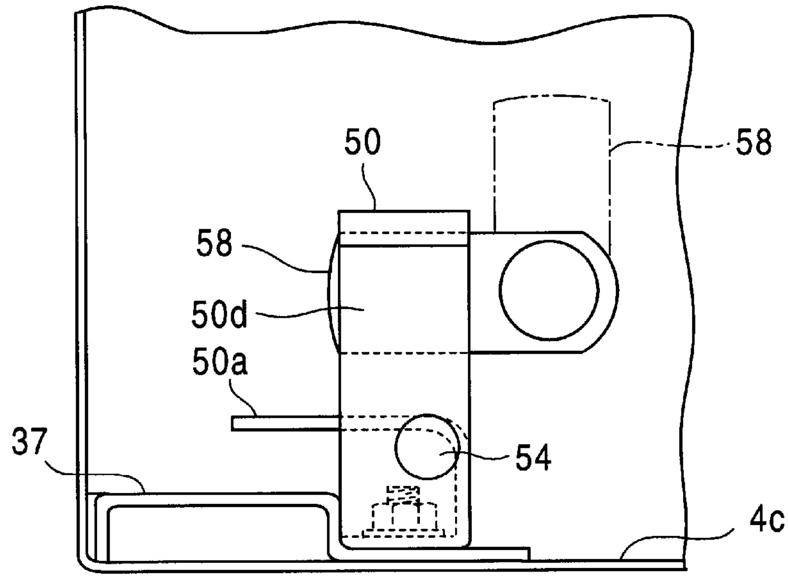
FIG. 6 is a detailed view of the part VI of FIG. 5.
Figure 7:
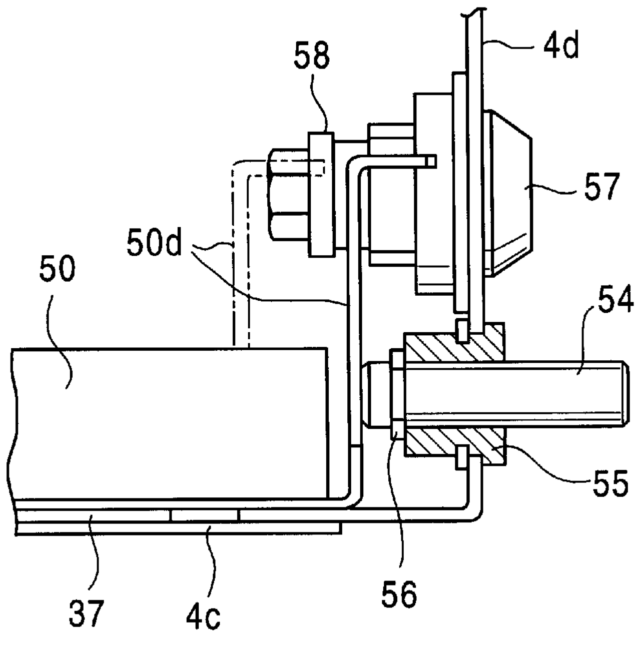
FIG. 7 is a sectional view taken along the line VII—VII of FIG. 5.

As shown in FIGS. 5 to 7 in detail, a drive portion 50*d* extending upward is disposed at the right end of the restraining member 50. In order to press the drive portion 50*d* toward the left in FIG. 4, a shaft-like driving member 54 is fitted movably in a lateral direction to the right side plate 4*d* of the top box 4 through a bushing 55, and is prevented from falling out by a snap ring 56. A lock 57 is disposed near the driving member 54. The lock 57 is provided with a rotation shaft (not shown) which is rotated only when a predetermined key is inserted into the lock 57, and a locking plate 58 is mounted to the end of the rotation shaft.

When the lock 57 is operated to rotate the locking plate 58 to the position shown by the solid line in FIG. 6 with the engagement pawl 50*a* of the restraining member 50 engaged with the engagement plate 41 d of the movable member 40, the locking plate 58 opposes the drive portion 50*d* of the restraining member 50 and the driving member 54 is locked. That is, in this state, the driving member 54 cannot be pressed in, and the movable member 41 cannot be pulled out to remove the display panel 16.

On the other hand, the lock 57 is operated to separate the locking plate 58 from the drive portion 50*d* (the arrow F in FIG. 4), and the driving member 54 is pressed in so as to allow the restraining member 50 to move such that the engagement pawls 50*a* are disengaged from the engagement plates 41 d of the movable member 41 (the arrows G and H), whereby the movable member 41 can be pulled out (the arrow I) and the display panel 16 can be removed. When pressing in the movable member 41, the engagement plates 41 d come into contact with tapered portions 50*e* of the engagement pawls 50*a*, so that the restraining member 50 is gradually pressed toward the left of FIG. 4. When the engagement plates 41*d* cross over the engagement pawls 50*a*, the restraining member 50 moves to the right of FIG. 4 and the engagement pawls 50*a* are engaged with the engagement plates 41*d*, whereby the movable member 41 is restrained.

Figure 8:
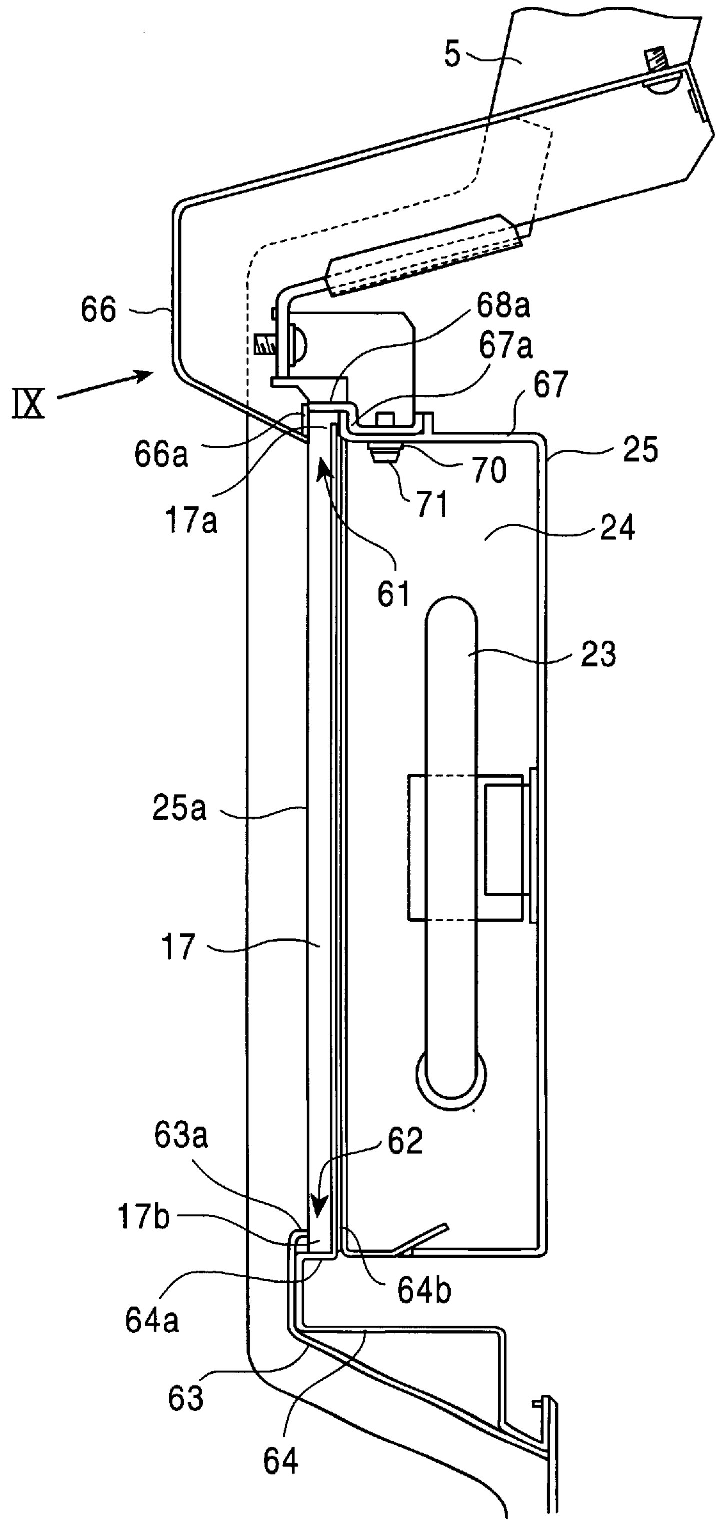
FIG. 8 is a vertical sectional view of a door in a longitudinal direction in a slot machine to which a panel mounting apparatus of the present invention is incorporated.

FIGS. 8 to 11 illustrate an apparatus for mounting the display panel 17 to the door 5 of the housing 2. As shown in FIG. 8, a lighting box 25 defining an accommodating section 24 for a fluorescent lamp 23 is provided inside the door 5. The display panel 17 is mounted to an opening 25*a* provided at the front of the lighting box 25, whereby the lighting box 25 is closed.

A pair of retainer frames 61 and 62 to be engaged with the upper and lower ends 17*a* and 17*b*, respectively, of the display panel 17 are formed at the upper and lower edges of the opening 25*a* of the lighting box 25. The lower retainer frame 62 is constructed so as to surround the lower end 17*b* of the display panel 17 from front and back, and from below by a bent portion 63*a* of a lower front plate 63 which constitutes the front surface of the door 5, a panel receiver 64*a* and a vertical wall portion 64*b* of a stiffening plate 64 fixed to the back of the lower front plate 63.

Figure 9:
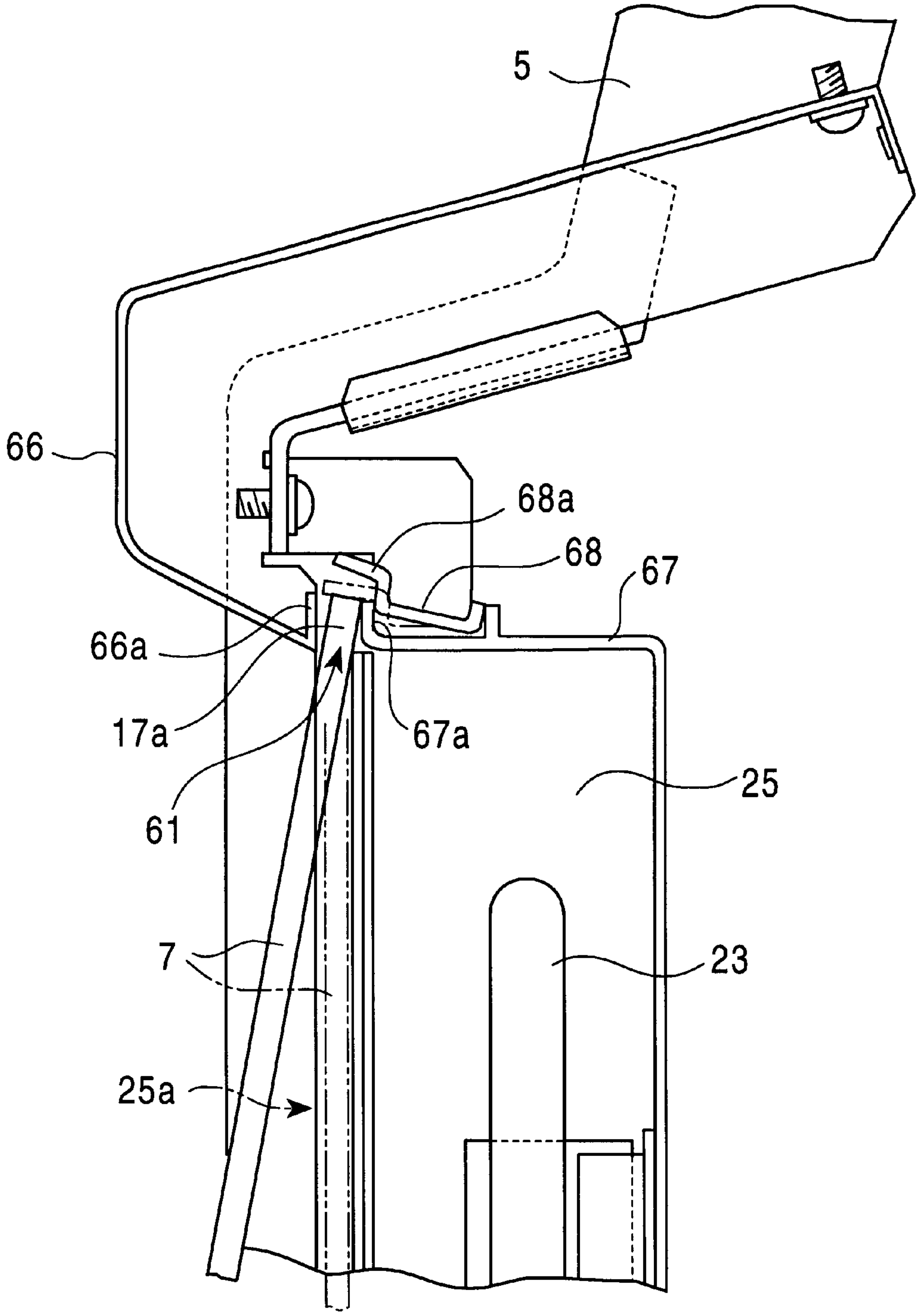
FIG. 9 is an enlarged view of the part IX of FIG. 8.

As shown in FIG. 9, the upper retainer frame 61 is constructed so as to surround the upper end 17*a* of the display panel 17 from front and back, and from above by a front wall portion 66*a* formed at the end of an upper front plate 66, a rear wall portion 67*a* formed at the front end of an upper wall plate 67 constituting the ceiling of the lighting box 25 and a panel receiver 68*a* of a movable member 68 mounted on the upper surface of the upper wall plate 67.

Figure 10A:
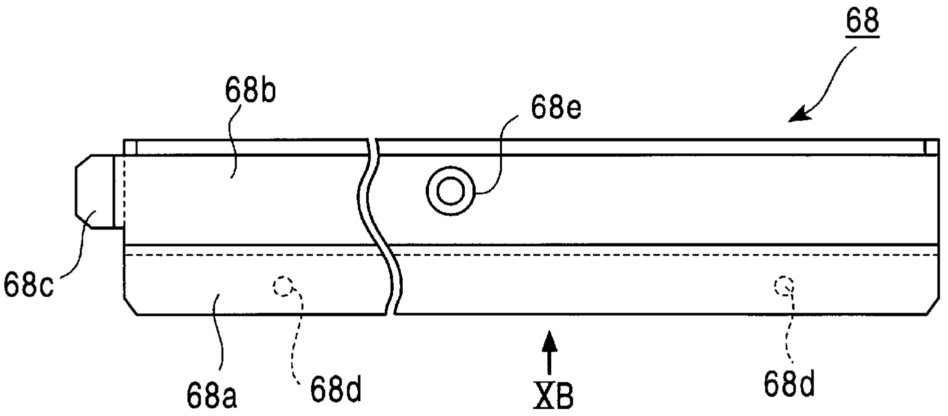
Figure 10B:
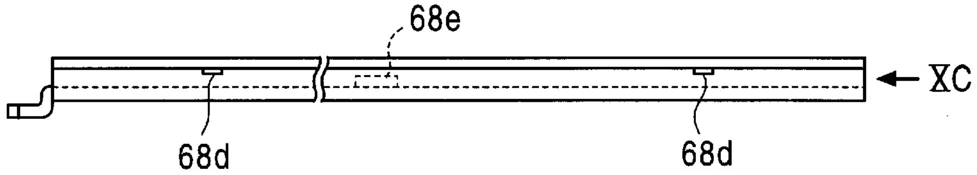
Figure 10C:
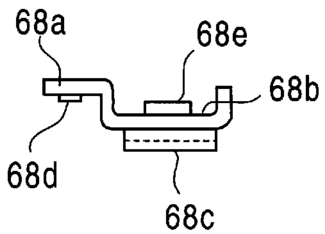

FIGS. 10A to 10C illustrate the movable member 68 in detail. The movable member 68 is formed by a plate work using thin plate, such as steel plate as a material, and includes the panel receiver 68*a*, a junction 68*b* provided on the level lower than the panel receiver 68*a*, and an engaging portion 68*c* disposed on one end of the junction 68*b*. On the lower surface of the panel receiver 68*a*, i.e., the surface opposing the end surface, i.e., the edge surface, of the display panel 17, there are provided projections 68*d* at suitable intervals along the length of the movable member 68. A single female screw hole 68*e* is provided on the other end of the junction 68*b*.

Figure 11A:
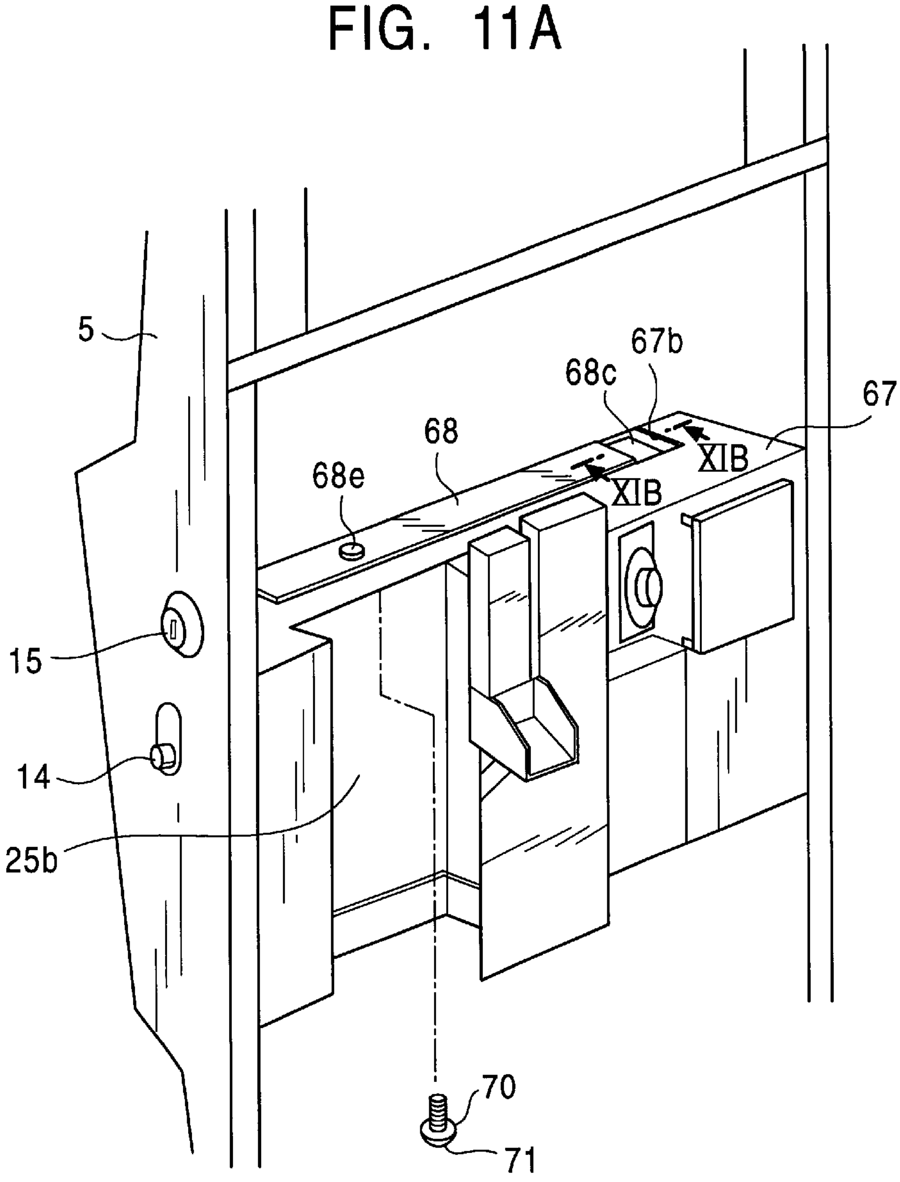
Figure 11B:
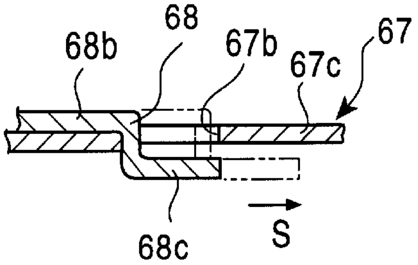

As shown in FIG. 11A, an engagement portion 68*c* of the movable member 68 is inserted into a punched hole 67*b* (an engaging portion of the casing) formed in the upper wall plate 67, and a screw 71 fitted from the lower surface of the upper wall plate 67 through a washer 70 is screwed into the female screw hole 68*e*, whereby the movable member 68 is mounted on the upper surface of the upper wall plate 67. That is, as shown in FIG. 11B in detail, the punched hole 67*b* is sufficiently large for passing therethrough the engaging portion 68*c* of the movable member 68. When the engaging portion 68*c* is inserted into the punched hole 67*b* and the movable member 68 is slid along the length thereof, as shown by the arrow S, the engaging portion 68*c* opposes the lower surface of an engaging portion 67*c* of the upper wall plate 67, whereby one end of the movable member 68 is prevented from being removed upward. In this state, the screw 71 is fitted to secure the movable member 68. However, even if the screw 71 is fastened, the engaging portion 68*c* of the movable member 68 is not adhered closely to the engaging portion 67*c* of the upper wall plate 67.

A depression 25*b* is formed in the lighting box 25 corresponding to the position of the screw 71, and the lower surface of the upper wall plate 67 is exposed to the outside of the lighting box 25 at the depression 25*b* when the door 5 is opened. Therefore, the door 5 can be opened to operate the screw 71 from below by an operating tool, such as a screwdriver.

According to the mounting apparatus shown in FIGS. 8 to 11, loosening of the screw 71 produces play between the engaging portion 68*c* of the movable member 68 and the engaging portion 67*c* of the upper wall plate 67 corresponding to the size of the gap therebetween, whereby the movable member 68 can move up and down. Therefore, as shown in FIG. 9, when the upper end 17*a* of the display panel 17 is inserted into the retainer frame 61 and pressed upward, the panel receiver 68*a* of the movable member 68 moves upward. In this state, when the display panel 17 is rocked using the retainer frame 61 as a fulcrum so as to fit its lower end 17*b* to the retainer frame 62, and then the screw 71 is fastened, the movable member 68 is adhered closely to the upper wall plate 67 without any play, so that the display panel 17 is held between the panel receivers 68*a* and 64*a*. Even if warpage occurs in the movable member 68 during its plate working, the upper end 17*a* of the display panel 17 abuts against the projections 68*d* at a plurality of points, thereby holding the display panel 17 securely.

If the door 5 is opened and the screw 71 is loosened, the display panel 17 can be pulled out to the front of the door 5 by reversing the above order. This allows the display panel 17 to be exchanged, and allows maintenance and exchange of the fluorescent lamp 23 accommodated in the lighting box 25 to be effected.

The present invention is not limited to the above-described embodiment, and various changes and modifications may be made. For example, a pair of retainer frames for retaining the left and right ends of the panel may be provided, and a movable member is provided on one of the retainer frames. In addition, the movable member may be provided on both of the retainer frames so as to attach and detach the panel to and from each of the retainer frames.

As described above, according to the present invention, a retainer frame for retaining an end of a panel of a game machine is provided with a movable member so as to change the shape of the retainer frame. Thus, the panel can be retained, and attached and detached only by moving the movable member. Therefore, the panel can be easily attached and detached as compared with the conventional apparatus which requires removal of a large retainer frame surrounding the whole circumference of the panel, thereby reducing the labor required for maintenance and exchange of the panel and the lighting fixture placed inside thereof.

What is claimed is:

1. A mounting apparatus for mounting a game machine panel which is light transmitting to an opening of a lighting fixture accommodating section provided in a housing of the game machine, said apparatus comprising:

retainer frames disposed at opposing sides of said opening for retaining parallel ends of said game machine panel;

a movable member provided on one of said retainer frames for moving between a first state of preventing removal of said game machine panel and a second state of allowing removal of said game machine panel; and said movable member being movably disposed in said one of said retainer frames to move from said first state, whereat said movable member opposes a front surface of said panel, to said second state, whereat said movable member is clear of said front surface of said panel, by a sliding movement outward from a plane of said panel and a rotating movement about an axis parallel to a respective one of said parallel ends of said panel.

2. The mounting apparatus for mounting a game machine panel according to claim 1, wherein:

said housing has a top box disposed at an upper end of said housing;

said accommodating section is provided in said top box;

said opening is provided in a front side of said top box;

said retainer frames are provided on upper and lower edges of said opening; and said movable member is provided on the retainer frame of the lower end of said top box.

3. The mounting apparatus for mounting a game machine panel according to claim 1, further comprising:

a restraining member movable between a restraint position where said movable member is restrained at said first position and a restraint-removal position where said movable member is permitted to move from said first position to said second position;

a driving member for driving said restraining member towards said restraint-removal position by an operation from outside of said housing; and locking means, responsive to operation of a predetermined key, for switching between an unlocked state of allowing said restraining member to be driven by said driving member towards said restraint-removal position and a locked state of preventing said restraining member from being driven by said driving member towards said restraint-removal position.

4. A mounting apparatus for mounting a game machine panel which is light transmitting to an opening of a lighting fixture accommodating section provided in a housing of the game machine, said apparatus comprising:

retainer frames disposed at opposing sides of said opening for retaining parallel ends of said game machine panel;

a movable member provided on one of said retainer frames for moving between a first state of preventing removal of said game machine panel and a second state of allowing removal of said game machine panel;

said movable member being movably disposed in said one of said retainer frames so as to oppose an edge surface of said game machine panel and move towards and away from said edge surface between a first position, of said first state, fixing said game machine panel in place, and a second position, of said second state, away from said edge surface permitting removal of said game machine panel by displacement of said game machine panel toward said movable member;

said movable member having an engaging surface disposed at a first end engagable with an engagement portion of said housing so as to permit movement of said movable member between said first position and said second position; and said movable member having a mounting member disposed at a second end thereof for selectively fixing said movable member to said housing at said first position in conjunction with engagement of said engaging surface and said engagement portion of said housing.

5. The mounting apparatus for mounting a game machine panel according to claim 4, wherein:

said mounting member is a screw device; and said engaging surface of said movable member and said engagement portion of said housing engage one another with play therebetween for allowing said movable member to move between said first position and said second position when said screw device is loosened.

6. The mounting apparatus for mounting a game machine panel according to claim 4, wherein:

said housing includes a main body, a door for opening and closing a front of said main body, and locking means for restricting the opening and closing of said door, said accommodating section is provided in said door, said movable member is mounted in said door by a mounting member portion of said screw device mounted from the inside of said door; and said movable member is selectively fixed in said first position in response to operation of said mounting member.

7. The mounting apparatus for mounting a game machine panel according to claim 1, wherein one of said retainer frames has a cutaway so that an end of said panel holdable by hand.

8. A game machine, comprising:

a housing having provided therein a lighting fixture accommodating section defining an opening;

a game machine panel for transmitting light which is mountable in said opening of said accommodating section; and a panel mounting apparatus for mounting said light-transmittable game machine panel said panel mounting apparatus including:

retainer frames disposed at opposing sides of said opening for retaining parallel ends of said game machine panel and a movable member provided on one of said retainer frames for moving between a first state of preventing removal of said game machine panel and a second state of allowing removal of said game machine panel; and said movable member being movably disposed in said one of said retainer frames to move from said first state, whereat said movable member opposes a front surface of said game machine panel, to said second state, whereat said movable member is clear of said front surface of said game machine panel, by a sliding movement outward from a plane of said game machine panel and a rotating movement about an axis parallel to a respective one of said parallel ends of said game machine panel.

9. The game machine according to claim 8, wherein:

said housing has a top box disposed at an upper end of said housing;

said accommodating section is provided in said top box;

said opening is provided in a front side of said top box;

said retainer frames are provided on upper and lower edges of said opening; and said movable member is provided on the retainer frame of the lower end of said top box.

10. The game machine according to claim 8, further comprising:

a restraining member movable between a restraint position where said movable member is restrained at said first position and a restraint-removal position where said movable member is permitted to move from said first position to said second position;

a driving member for driving said restraining member towards said restraint-removal position by an operation from outside of said housing; and locking means, responsive to operation of a predetermined key, for switching between an unlocked state of allowing said restraining member to be driven by said driving member towards said restraint-removal position and a locked state of preventing said restraining member from being driven by said driving member towards said restraint-removal position.

11. A game machine comprising:

a housing having provided therein a lighting fixture accommodating section defining an opening;

a game machine panel for transmitting light which is mountable in said opening of said accommodating section; and a panel mounting apparatus for mounting said light-transmittable game machine panel;

said panel mounting apparatus including:

retainer frames disposed at opposing sides of said opening for retaining parallel ends of said game machine panel; and a movable member provided on one of said retainer frames for moving between a first state of preventing removal of said game machine panel and a second state of allowing removal of said game machine panel; and said movable member being movably disposed in said one of said retainer frames so as to oppose an edge surface of said panel and move towards and away from said edge surface between a first position, of said first state, fixing said game machine panel in place and a second position, of said second state, away from said edge surface permitting removal of said game machine panel by displacement of said game machine panel toward said movable member;

said movable member having an engaging surface disposed at a first end engageable with an engagement portion of said housing so as to permit movement of said movable member between said first position and said second position; and said movable member having a mounting member disposed at a second end thereof for selectively fixing said movable member to said housing at said first position in conjunction with engagement of said engaging surface and said engagement portion of said housing.

12. The game machine according to claim 11, wherein:

said mounting member is a screw device; and said engaging surface of said movable member and said engagement portion of said housing engage one another with play therebetween for allowing said movable member to move between said first position and said second position when said screw device is loosened.

13. A game machine according to claim 11, wherein:

said housing includes a main body, a door for opening and closing a front of said main body, and locking means for restricting the opening and closing of said door;

said accommodating section is provided in said door, said movable member is mounted in said door by a mounting member portion of said screw device mounted from the inside of said door; and said movable member is selectively fixed in said first position in response to operation of said mounting member.

14. The game machine according to claim 8, wherein one of said retainer frames has a cutaway so that an end of said game machine panel is holdable by hand.

* * * * *